(12) United States Patent  
Nonoyama et al.

(10) Patent No.: US 6,699,577 B2
(45) Date of Patent: Mar. 2, 2004

(54) AIR PURIFICATION-FUNCTIONING ROAD AND METHOD FOR PURIFYING POLLUTED AIR OVER ROAD

(75) Inventors: Noboru Nonoyama, Tokyo (JP); Hiromi Koga, Tokyo (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 09/509,446

(22) PCT Filed: Jul. 26, 1999

(86) PCT No.: PCT/JP99/03992

§ 371 (c)(1),
(2), (4) Date: Mar. 28, 2000

(87) PCT Pub. No.: WO00/06828

PCT Pub. Date: Feb. 10, 2000

(65) Prior Publication Data

US 2003/0129412 A1 Jul. 10, 2003

(30) Foreign Application Priority Data

Jul. 29, 1998 (JP) ............................................. 10-213889
Jul. 29, 1998 (JP) ............................................. 10-213903

(51) Int. Cl.$^7$ ........................... B01D 53/00; B08B 3/04; B32B 5/16; B32B 13/02; E01C 9/00
(52) U.S. Cl. ..................... 428/323; 428/328; 428/688; 428/689; 428/703; 134/4; 134/6; 134/42; 134/104.1; 134/115 R; 134/198; 204/157.3; 404/71; 422/177; 422/178; 422/180; 427/136; 427/138; 427/427
(58) Field of Search ....................... 134/4, 6, 42, 104.1, 134/115 R, 198; 204/157.3; 422/177, 178, 180; 428/304.4, 307.3, 308.4, 312.4, 317.9, 318.4, 421, 688, 689, 703, 489, 328, 323; 404/71; 427/136, 138, 427

(56) References Cited

U.S. PATENT DOCUMENTS 3,782,843 A * 1/1974 Eigenmann ................. 404/9
5,432,213 A * 7/1995 Kim et al. ................. 524/41
5,948,833 A * 9/1999 Jilek et al. ................ 523/172
6,020,073 A * 2/2000 Wilson, Sr. ............... 428/489
6,077,492 A * 6/2000 Anpo et al. .............. 423/239.1

FOREIGN PATENT DOCUMENTS

| DE | 2443835 A | * | 4/1976 |
|---|---|---|---|
| EP | 0 633064 | | 1/1995 |
| EP | 0786283 A1 | * | 7/1997 |
| JP | 3-058605 | | 9/1991 |
| JP | 4-138405 | | 12/1992 |
| JP | 07 331120 | | 12/1995 |
| JP | 08 173764 | | 7/1996 |
| JP | 9-057096 | | 3/1997 |
| JP | 9-249824 | | 9/1997 |
| JP | 9-268509 | | 10/1997 |
| JP | 10 195333 | | 7/1998 |
| JP | 11-006102 | | 1/1999 |

OTHER PUBLICATIONS

Derwnt 1976–26609X, abstract of DE 2443835 A, Apr. 1976.*

* cited by examiner

Primary Examiner—Ramsey Zacharia
(74) Attorney, Agent, or Firm—Paul E. White, Jr.; Manelli Denison & Selter PLLC

(57) ABSTRACT

At least one part of a road surface is covered by a photocatalyst layer containing a photocatalyst such as titanium dioxide, etc. to purify pollutants in exhaust gases emitted from vehicles by photocatalytic reaction of the photocatalyst. Pollutant-originating matters as retained on the photocatalyst layer are washed away by rain water or sprinkled water. In one embodiment of the invention, road 12 is a road provided with a dewaterable pavement and rain water passes through surface layer 18 during raining, flows over and along base layer 16 and is discharged. In surface layer 18, numerous aggregates of small particle sizes 1802 are projected from the entire surface of concrete layer 1804. Titanium dioxide layer 20 is formed by injecting or spraying a mixture comprising titanium dioxide, cement, a filler and water onto the entire surface of surface layer 18 thinly and is water-permeable.

11 Claims, 3 Drawing Sheets

AIR PURIFICATION-FUNCTIONING ROAD AND METHOD FOR PURIFYING POLLUTED AIR OVER ROAD

This application is the national phase of international application PCT/JP99/03992 filed Jul. 26, 1999 which designated the U.S.

TECHNICAL FIELD

The present invention relates to an air purification-functioning road and a method for purifying polluted air over roads.

BACKGROUND ART

Exhaust gases emitted from vehicles contain a large amount of pollutants such as nitrogen oxides ($NO_x$), etc., polluting the atmospheric air.

In these days calling for protection of the global environment, it is most desirable to purify such polluted air.

In this connection, catalytic air purification apparatuses have been so far proposed.

DISCLOSURE OF INVENTION

However, mere provision of such catalytic air purification apparatuses in heavy air pollution areas has had a space problem and also a problem of spoiling the road appearance and thus has been hard to realize.

Available surface areas of roads such as pedestrian sidewalks, car running roadways, etc. are so large that it has been regarded as ideal to utilize such larger road surfaces for purification of the polluted air and particularly more desirable from the viewpoint of diffusion prevention of polluted air, if the polluted air over car running roadways can be carried out.

Photocatalysts capable of causing a photocatalytic reaction to take place even at the ordinary temperature when exposed to light such as titanium dioxide ($TiO_2$), etc. are now attracting considerable attention. It is known that pollutants such as nitrogen oxides, etc. are converted by the photocatalytic reaction caused by the photocatalysts when exposed to light and the converted matters are retained on the catalysts and removed therefrom by water washing.

The present invention is based on a large available surface areas of roads and a photocatalyst such as a titanium dioxide, and is directed to a road capable of purifying polluted air without any space problem or problem of spoiling the road appearance and also to a method for purifying polluted air over the road.

In order to attain the above object, the present invention provides an air purification-functioning road, in which a photocatalyst layer comprising a photocatalyst such as titanium dioxide, etc. and a retainer material for retaining the photocatalyst being fixed to the surface of the road by a fixer material and at least one part, preferably the whole of the surface of the road being covered by the photocatalyst layer. The retainer material and the fixer material can be made from the same material.

Preferably, the road is provided with a dewaterable pavement and the photocatalyst layer is water-permeable and formed on the dewaterable pavement. The dewaterable pavement is not particularly limited thereto and can include those as will be described later.

According to one embodiment of the present invention, the photocatalyst layer comprises a photocatalyst, cement, a filler and water, where the cement can serve as the retainer material and the fixer material at the same time.

According to another embodiment of the present invention, the photocatalyst layer comprises a photocatalyst and an inorganic paint, where the inorganic paint can serve as the retainer material and the fixer material at the same time.

According to other embodiment of the present invention, the photocatalyst layer is a sheet comprising a photocatalyst and a fluororesin, where the fluororesin can serve as the retainer material and the fixer material at the same time.

In order to attain aforementioned object, the present invention provides a method for purifying polluted air over roads, which comprises fixing a photocatalyst layer comprising a photocatalyst such as titanium oxide, etc. and a retainer material for retaining the photocatalyst to at least one part, preferably the whole of a road surface by a fixer material, thereby covering the part or the whole of the road surface, purifying pollutants in exhaust gases emitted from vehicles by photocatalytic reaction of the photocatalyst and sprinkling water onto the road surface, thereby washing away pollutant-originating matters as retained on the photocatalyst layer.

Preferably, the road is provided with a dewaterable pavement, and the photocatalyst layer is water-permeable and is formed on the dewaterable pavement.

It is preferable to periodically sprinkle water in accordance with the degree of pollution.

According to one embodiment of the present invention, the photocatalyst layer is formed by injecting or spraying a mixture comprising a photocatalyst, cement, a filler and water onto the road surface, where the cement serves as the retainer material and the fixer material at the same time.

According to another embodiment of the present invention, the photocatalyst bed is also formed by injecting or spraying a mixture comprising a photocatalyst and an inorganic paint onto the road surface, where the inorganic paint serves as the retainer material and the fixer material at the same time.

In the present invention, it is preferable that the road is for vehicle use only and water sprinkling is carried out from the center line towards both sides in the width direction of the road.

In the present invention, the photocatalyst causes photocatalytic reaction to take place when exposed to sun light, purifying polluted air by the photocatalytic reaction.

Photocatalyst is a substance capable of causing a photocatalytic reaction to take place, when irradiated with light with a wavelength of energy corresponding to its band gap or higher. The photocatalyst for use in the present invention includes at least one of metal compound semiconductors such as titanium dioxide, zinc oxide, tungsten oxide, iron oxide, strontium titanate, bismuth oxide, molybdenum sulfide, cadmium sulfide, etc. At least one of metals such as copper, silver, gold, lanthanum, cerium, zinc, vanadium, iron, cobalt, nickel, ruthenium, rhodium, palladium, platinum, etc. or their metal compounds can be added to the surfaces and/or insides of particles of the metal compound semiconductor. In the present invention titanium dioxide is particularly preferable from the viewpoint of its distinguished photocatalytic reaction.

"Titanium dioxide" includes so called hydrous titanium oxide, hydrated titanium oxide, metatitanic acid, orthotitanic acid and titanium hydroxide besides the titanium dioxide, and also includes titanium dioxide containing at least one of metals such as copper, silver, gold, lanthanum, cerium, zinc, vanadium, iron, cobalt, nickel, ruthenium, rhodium, palladium, platinum, etc. or their metal compounds added to the surfaces and/or insides of particles of the titanium dioxide. Addition of at least one of the metals or their metal compounds to the surfaces and/or insides is preferable from the viewpoint of the distinguished photocatalytic reaction. Titanium dioxide containing at least one of such metals as gold, lanthanum, iron, ruthenium, rhodium, palladium and platinum or their meal compounds as added to the surfaces and/or insides of particles of titanium dioxide is particularly preferable.

Atmospheric air pollutants include, for example, nitrogen oxides ($NO_x$), sulfur compounds such as sulfur oxides ($SO_x$), hydrogen sulfide, etc. carbon monoxide, hydrocarbons (HC), etc., as contained in exhaust gases emitted from vehicles, and also include air pollutants and also foul-smelling matters as emitted from factories, livestock farms, refuse incineration plants, dumping grounds, etc. Nitrogen oxides ($NO_x$) and sulfur oxides ($SO_x$) are converted to nitric acid and sulfuric acid, respectively, by photocatalytic reaction of the photocatalyst layer and retained on the photocatalyst layer, whereas carbon monoxide is converted to carbon dioxide and is toxically abated thereby. Many other pollutants are also decomposed by the photocatalytic reaction.

The pollutants retained on the photocatalyst layer are washed away from the photocatalyst layer by rain water during raining or by artificially sprinkled water, while the photocatalyst layer can be brought into an activated state of photocatalytic reaction again.

That is, mere provision of a photocatalytic layer on the surface of the existing dewaterable pavement can purify polluted air through contact with the photocatalytic layer on the road surface and prevent diffusion of the polluted air. There is not any space problem or road appearance problem.

Furthermore, owing to the broad road surface by nature and also to numerous fine projections and depressions formed on the dewaterable pavement surface, as will be described later, the surface area of the photocatalyst layer can be much more increased and purification of polluted air by the photocatalyst layer can be effectively carried out.

Even if the photocatalyst layer on the dewaterable pavement surface is worn out by running of vehicles, there still remains the photocatalyst layer in the numerous fine depressions formed between the adjacent projections. The remaining photocatalyt layer in the depressions can compensate for the worn-out photocatalyst.

BEST MODE FOR CARRYING OUT THE INVENTION

The present invention will be described in detail below, referring to embodiments and drawings.

Figure 1:
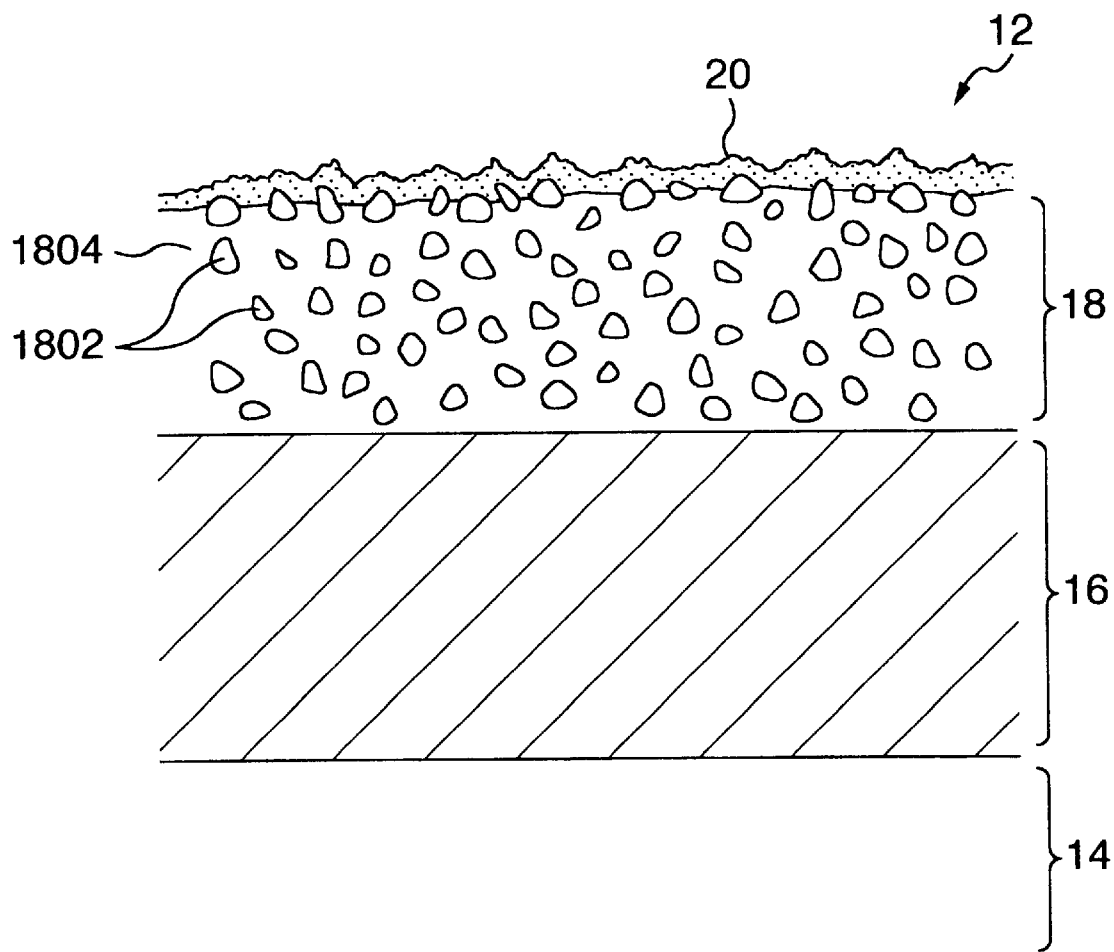
FIG. 1 is a cross-sectional view showing the essential part of an air purification-functioning road.

FIG. 1 is a cross-sectional view showing the essential part of an air purification-functioning road.

In this embodiment, the surface of air purification-functioning road 12 is covered with titanium dioxide layer 20. Road 12 is a road provided with a dewaterable pavement and has a noise abatement effect. That is, base layer 16 is provided on base course 14 and water-permeable surface layer 18 is provided on base layer 16. During raining, rain water passes through surface layer 18, flows over and along base layer 16 and is discharged.

In surface layer 18, a large number of aggregates 1802 of small particle sizes are projected from the entire surface of concrete layer 1804. Aggregates of small particle sizes have a maximum particle size of about 4 to about 8 mm and form numerous projections and depressions.

Titanium dioxide layer 20 comprising titanium dioxide ($TiO_2$) and a retainer material for retaining the titanium oxide is provided on the surface of surface layer 18 through a fixer material.

According to the present embodiment, titanium dioxide layer 20 is formed by injecting or spraying a mixture comprising titanium dioxide, cement, a filler and water onto the entire surface of said surface layer 18 thinly, where the cement serves as a retainer material and a fixer material at the same time and titanium dioxide layer 20 is water-permeable.

The filler is used to increase the volume, and in the present embodiment sand is used. Besides the sand, other fillers such as glass beads, ceramic particles, etc. can be used.

A mixing ratio of titanium dioxide:cement:filler by weight can be selected as desired, for example, 1:3:2.

By injecting or spraying such mixture onto the surface of surface layer 18 thinly, projections and depressions in configurations corresponding to those of the numerous projections and depressions formed by a large number or aggregates 1802 of small particle sizes are also formed. Further, numerous additional projections and depressions due to the injection spots of the mixture are formed on the injected surface.

If desired, an adsorbent such as activated carbon, etc. can be added to the mixture to enhance a pollutant-adsorbing action. Other photocatalysts than titanium dioxide can be used.

When titanium dioxide layer 20 on road 12 in said structure is exposed to sun light during the daytime, titanium dioxide causes photocatalytic reaction to take place. Among the pollutants in polluted air, e.g. nitrogen oxides such as nitrogen monoxide, nitrogen dioxide, etc. are ultimately converted to nitric acid by the photocatalytic reaction, and retained on titanium dioxide layer 20 as nitric acid, thereby purifying polluted air.

Pollutants retained on titanium dioxide layer 20, such as nitric acid, etc. are washed away from titanium dioxide layer 20 by rain water during raining and removed therefrom, whereby titanium dioxide layer 20 is brought into an activated state of photocatalytic reaction again.

Embodiments of applying the present invention to an elevated roadway for vehicle use only will be described below.

Figure 2:
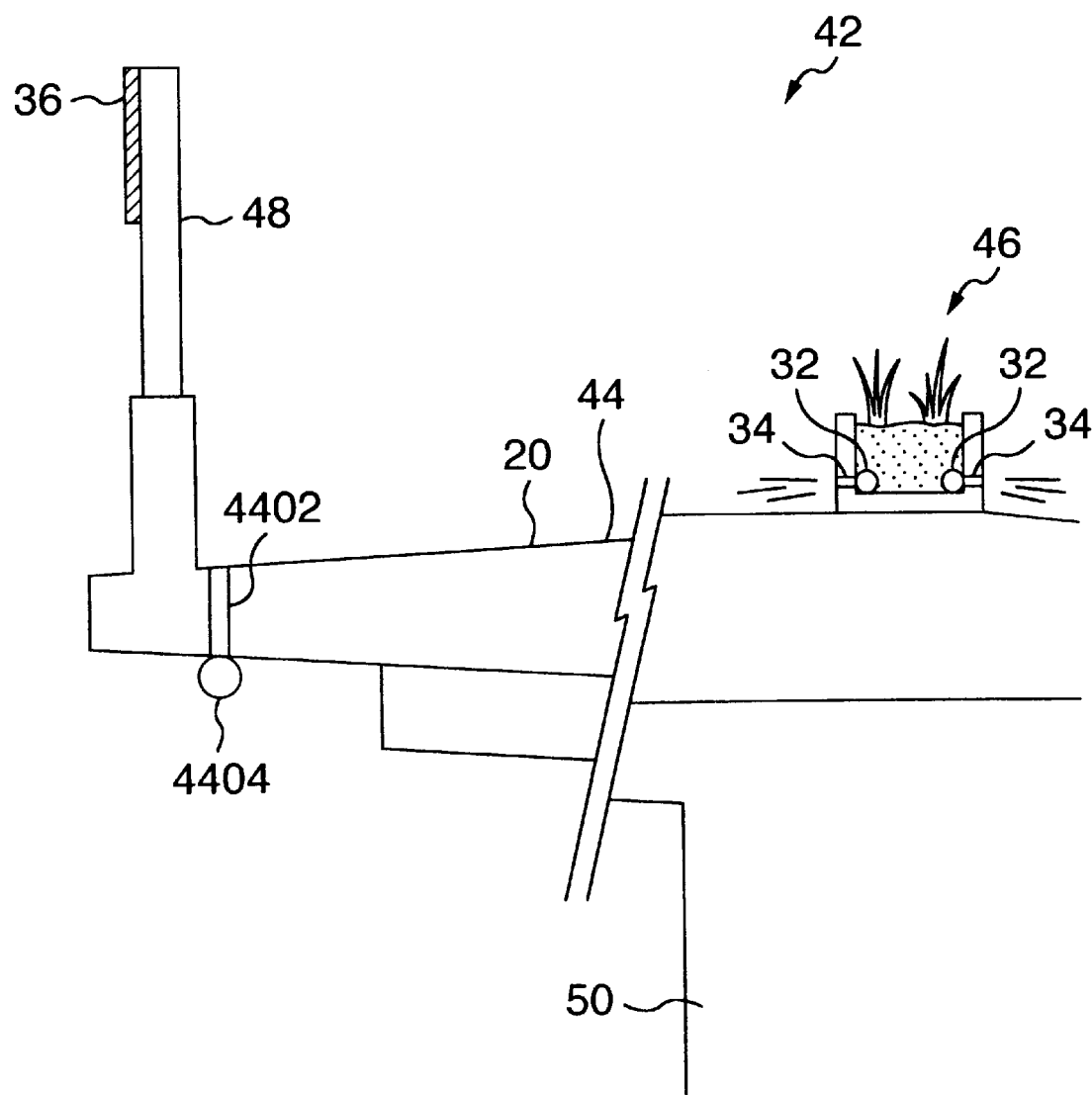
FIG. 2 is a cross-sectional view showing one-half of an elevated roadway according to the present invention.
Figure 3:
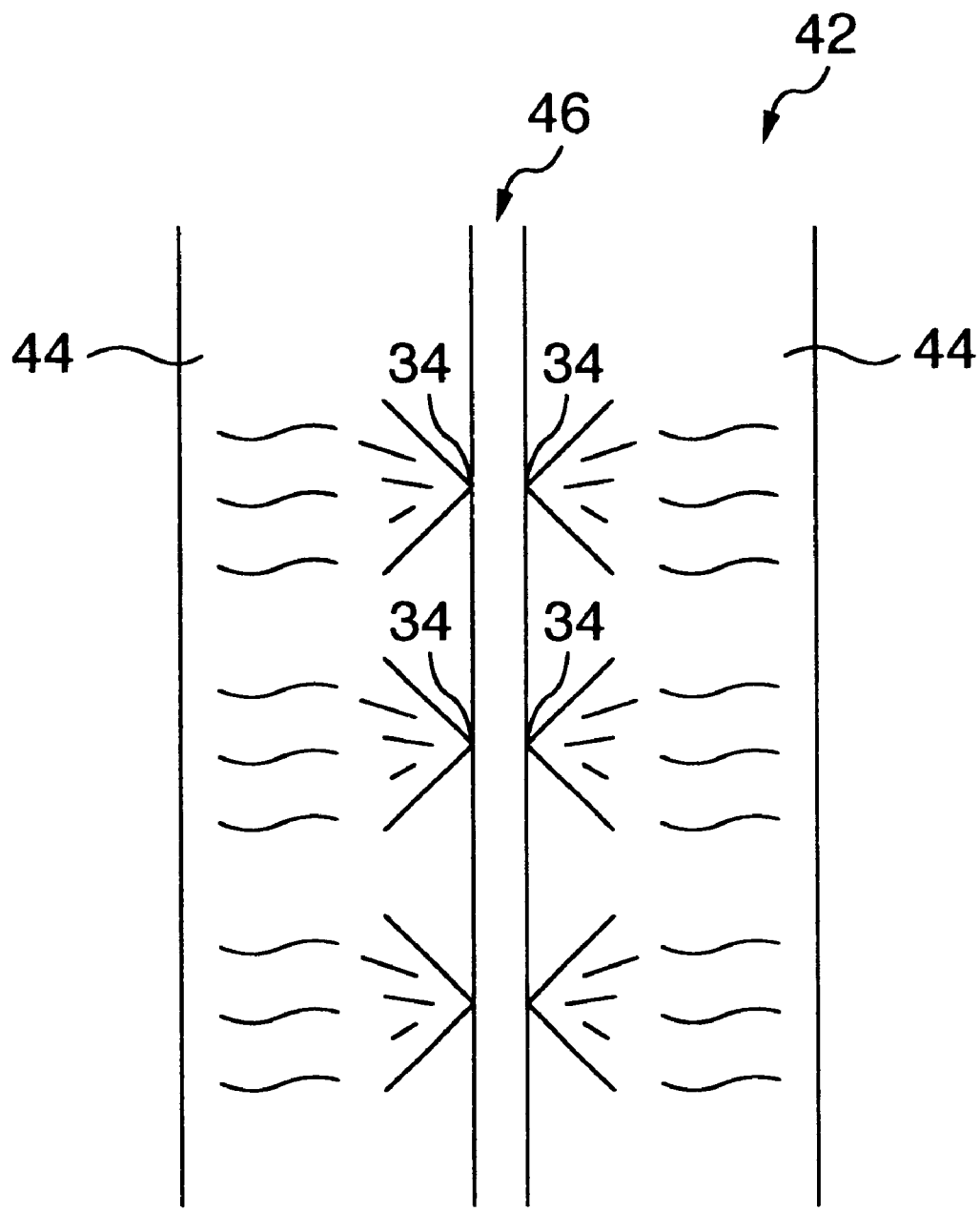
FIG. 3 is a plan view of the elevated roadway of FIG. 2.

In FIG. 2 showing a cross-sectional view of one-half of an elevated roadway and FIG. 3 showing a plan view of FIG. 2.

Numeral 42 shows an elevated roadway, 44 a roadway, 46 a median strip, 48 a side wall and 50 a strut, where the entire surface of roadway 44 is covered with titanium dioxide layer 20 having the same composition as mentioned before.

Roadway 44 is provided with a dewaterable pavement thereon and has a noise abatement effect. That is, as shown in FIG. 1, base layer 16 is provided on base course 14 and surface layer 18 is provided on base layer 16. Surface layer is water-permeable and during raining, rain water passes through surface layer 18, flows over base layer 16 towards the outer sides in the width direction of roadway 44 and is discharged to the outside of elevated roadway 42 through water holes 4402 and drain pipes 4404.

In surface layer 18, numerous aggregates of small particle sizes 1802 are projected from the entire surface of concrete layer 1804. Maximum particle size of aggregates of small particle sizes is about 4 to about 8 mm. Numerous projections and depressions are formed on the entire surface of surface layer 18.

Median strip 46 is provided at the center line in the width direction of elevated roadway 42 and is longitudinally extended along roadway 44. In the present embodiment, median strip 46 serves as a shrubbery zone, and water supply pipes 32 is provided in median strip 46 at both sides thereof and longitudinally extended along median strip 46, and water sprinkler nozzles 34 are provided at water supply pipes 32 at given intervals in the longitudinal direction of water supply pipes 32.

Water is supplied to said water supply pipes 32 by electric power generated by solar cell panels 36 mounted on side walls 48. That is, the electric power generated by solar cell panels 36 drives a pump, which supplies water to water supply pipes 32 to sprinkle water from water sprinkler nozzles 34 provided at both sides of median strip 46 towards roadway 44.

Water sprinkled from water supply pipes 32 or water sprinkler nozzles 34 is to wash away the retained pollutants from titanium dioxide layer 20, as will be described below, and water sprinkling is carried out periodically, for example, once a day for duration of about 5 minutes.

When titanium dioxide layer 20 of elevated roadway 42 in such a structure as described above is exposed to sun light during the daytime, titanium dioxide causes photocatalytic reaction to take place. Among pollutants contained in polluted air, nitrogen oxides such as nitrogen monoxide, nitrogen dioxide, etc. are ultimately converted to nitric acid by the photocatalytic reaction, and retained on titanium dioxide layer 20 as nitric acid, thereby purifying the polluted air.

Furthermore, the pollutants retained on titanium dioxide layer 20, for example, nitric acid, etc. are washed away from titanium dioxide layer 20 by periodic water sprinkling from water supply pipes 32 or water sprinkler nozzles 34, whereby titanium dioxide layer 20 is always kept in an activated state of photocatalytic reaction. Needless to say, the pollutants can be removed from titanium dioxide layer 20 even by rain water during raining.

According to the present embodiment, merely a mixture containing a photocatalyst such as titanium dioxide, etc. is injected or sprayed onto the surface of the existing dewaterable pavement on the road surface, and thus polluted air can be purified over the road surface, while preventing the diffusion of the polluted air, without any space problem or road appearance problem.

Road 12, particularly elevated roadway 42, has a broad surface area by nature, and thus purification of polluted air by the photocatalyst layer such as a titanium dioxide layer, etc. can be effectively carried out.

According to the present embodiment, a mixture containing a photocatalyst such as titanium dioxide, etc. is injected or sprayed onto surface layer 18 with numerous projections and depressions formed by a large number of aggregates of small particle sizes 1802 and thus the resulting photocatalyst layer such as a titanium dioxide layer has projections and depressions in configurations corresponding to those of the projections and depressions on the surface layer. Further, numerous additional projections and depressions due to the injection spots of the mixture, so that the area of the photocatalyst layer in contact with the atmospheric air is considerably increased and purification of polluted air by the photocatalyst layer is effectively carried out.

Even if the photocatalyst layer such as a titanium dioxide layer, etc. with numerous fine projections and depressions formed by a large number of aggregates of small particle sizes 1802 on the surface of surface layer 18 is worn out by running of vehicles, there still remains the photocatalyst layer in the depressions formed by the aggregates of small particle sizes 1802, and the remaining photocatalyst layer in the fine depressions can compensate for the worn-out photocatalyst layer.

Pollutants such as nitric acid, etc. retained on the photocatalyst layer can be washed away by rain water during raining, periodic water sprinkling by water supply pipes 32 or water sprinkler nozzles 34, so that the photocatalyst layer can be kept in an activated state of photocatalytic reaction and thus purification of polluted air can be effectively carried out.

The photocatalyst layer containing a photocatalyst such as titanium dioxide, etc. can be formed on the road surface in any manner.

For example, a photocatalyst such as titanium dioxide, etc. is mixed with an inorganic paint, and the resulting liquid mixture is injected or sprayed onto the road surface or coated thereto, where the paint serves as retainer material and fixer material at the same time, or a photocatalyst such as titanium dioxide, etc. is mixed with fluororesin fibers and the resulting mixture is rolled into a sheet, and the rolled sheet is pressure welded to the road surface, where the fluororesin serves as retainer material and fixer material at the same time.

Though the foregoing embodiment relates to a case where the present invention is applied to the elevated roadway as a roadway for vehicle use only, the present invention is applicable also to all other roads including side walks and passages, and the form of water sprinkling means can be changed according to the circumstance conditions of the applied roads.

Industrial Applicability

According to the present invention, pollutants in exhaust gases emitted from vehicles can be purified by photocatalytic reaction of a photocatalyst layer by covering at least one part of road surface with a photocatalyst layer containing a photocatalyst such as titanium dioxide, etc. Pollutant-originating matters as retained on the photocatalyst layer are washed away by rain water during raining or artificially sprinkled water.

According to the present invention, polluted air can be purified over the road without any space problem or problem of spoiling the road appearance.

What is claimed is:
1. An air purification-functioning road comprising a photocatalyst layer consisting of a concrete that comprises a photocatalyst, cement and filler, which is formed on a dewaterable pavement, wherein the dewaterable pavement comprises aggregates having maximum particle size of about 4 to about 8 mm and provides projections and depressions on the surface of the dewaterable pavement which are caused by the aggregates, and the photocatalyst layer covers at least a part of the surface of the dewaterable pavement by injecting or spraying a mixture comprising a photocatalyst, cement which is used for forming a concrete layer, a filler and water onto the surface of the dewaterable pavement directly, said photocatalyst being titanium dioxide particles to which one or more of lanthanum and a lanthanum compound is added to the surfaces and/or insides of the particles.

2. An air purification-functioning road comprising a photocatalyst layer formed on a dewaterable pavement, wherein the dewaterable pavement comprises aggregates having maximum particle size of about 4 to about 8 mm and provides projections and depressions on the surface of the dewaterable pavement which are caused by the aggregates, and the photocatalyst layer covers at least a part of the surface of the dewaterable pavement by injecting, spraying or coating a mixture comprising a photocatalyst and an inorganic paint onto the surface of the dewaterable pavement directly, said photocatalyst being titanium dioxide particles to which one or more of lanthanum and a lanthanum compound is added to the surfaces and/or insides of the particles.

3. An air purification-functioning road according to claim 1 or claim 2, which comprises sprinkling means for washing away pollutant originating matters as retained on the photocatalyst layer.

4. A method of making an air purification-functioning road, which comprises injecting or spraying a mixture comprising a photocatalyst, cement which is used for forming a concrete layer, a filler and water onto the surface of the road directly and forming a photocatalyst layer consisting of a concrete that comprises the photocatalyst, cement and filler, which covers at least a part of the surface of the road, said photocatalyst being titanium dioxide particles to which one or more of lanthanum and a lanthanum compound is added to the surfaces and/or insides of the particles.

5. A method of making an air purification-functioning road, which comprises injecting, spraying or coating a mixture comprising a photocatalyst and an inorganic paint onto the surface of the road directly and forming a photocatalyst layer covers at least a part of the surface of the road, said photocatalyst being titanium dioxide particles to which one or more of lanthanum and a lanthanum compound is added to the surfaces and/or insides of the particles.

6. A method of making an air purification-functioning road according to claim 4 or claim 5, wherein the road being provided with a dewaterable pavement and the photocatalyst layer is formed on at least a part of the surface of the dewaterable pavement.

7. A method of making an air purification-functioning road according to claim 4 or claim 5, wherein the road being provided with sprinkling means for washing away pollutant originating matters as retained on the photocatalyst layer.

8. A method for purifying polluted air over a road, which comprises covering at least a part of the surface of the road with a photocatalyst layer consisting of a concrete that comprises a photocatalyst, cement and filler, by injecting or spraying a mixture comprising a photocatalyst, cement which is used for forming a concrete layer, a filler and water onto the surface of the road directly, purifying pollutants in exhaust gases emitted from vehicles by photocatalytic oxidative reaction of the photocatalyst and sprinkling water onto the surface of the road, thereby washing away pollutant originating matters as retained on the photocatalyst layer, said photocatalyst being titanium dioxide particles to which one or more of lanthanum and a lanthanum compound is added to the surfaces and/or insides of the particles.

9. A method for purifying polluted air over a road, which comprises covering at least a part of the surface of the road with a photocatalyst layer by injecting, spraying or coating a mixture comprising a photocatalyst and an inorganic paint onto the surface of the road directly, purifying pollutants in exhaust gases emitted from vehicles by photocatalytic reaction of the photocatalyst and sprinkling water onto the surface of the road, thereby washing away pollutant originating matters as retained on the photocatalyst layer, said photocatalyst being titanium dioxide particles to which one or more of lanthanum and a lanthanum compound is added to the surfaces and/or insides of the particles.

10. A method for purifying polluted air over a road according to claim 8 or claim 9, wherein the road being provided with a dewaterable pavement and the photocatalyst layer is formed on at least a part of the surface of the dewaterable pavement.

11. A method for purifying polluted air over a road according to claim 8 or claim 9, wherein the road is a roadway for vehicle use only and the sprinkling of water is carried out from the centerline towards both sides in the width direction of the road.

* * * * *